Nov. 3, 1931.                W. H. SCHMITT                1,829,946
                        HYDRAULIC SHOCK ABSORBER
                         Filed June 11, 1929        4 Sheets-Sheet 1
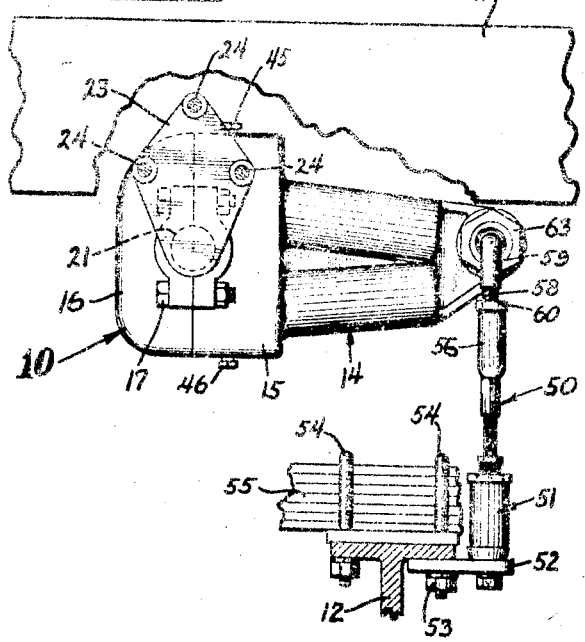
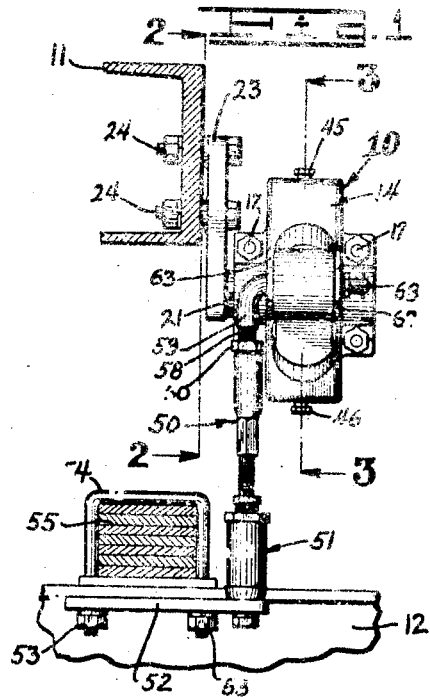
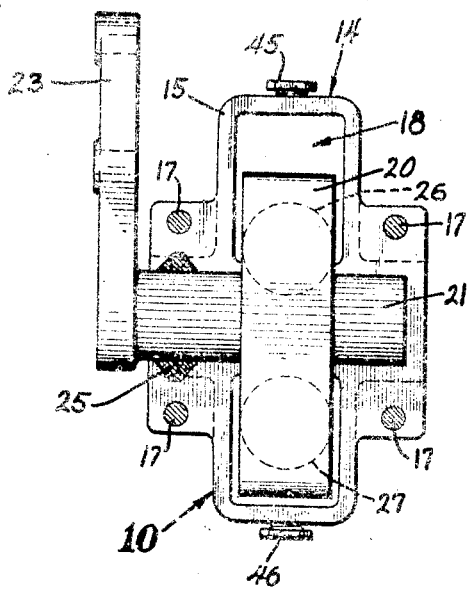
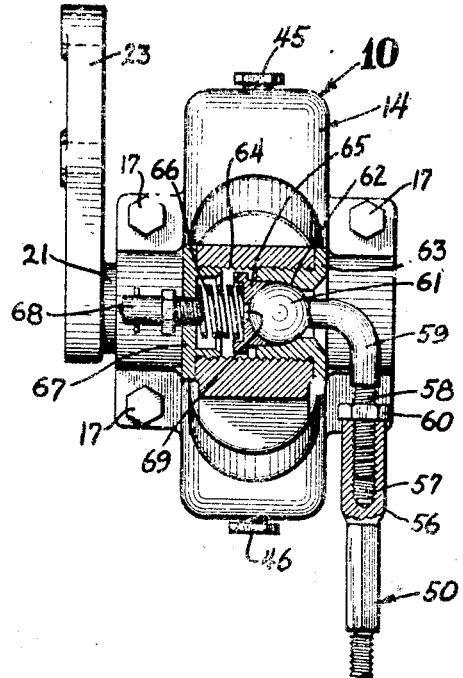
INVENTOR.
W. H. SCHMITT
BY
ATTORNEY.

Nov. 3, 1931.    W. H. SCHMITT    1,829,946
HYDRAULIC SHOCK ABSORBER
Filed June 11, 1928    4 Sheets-Sheet 2
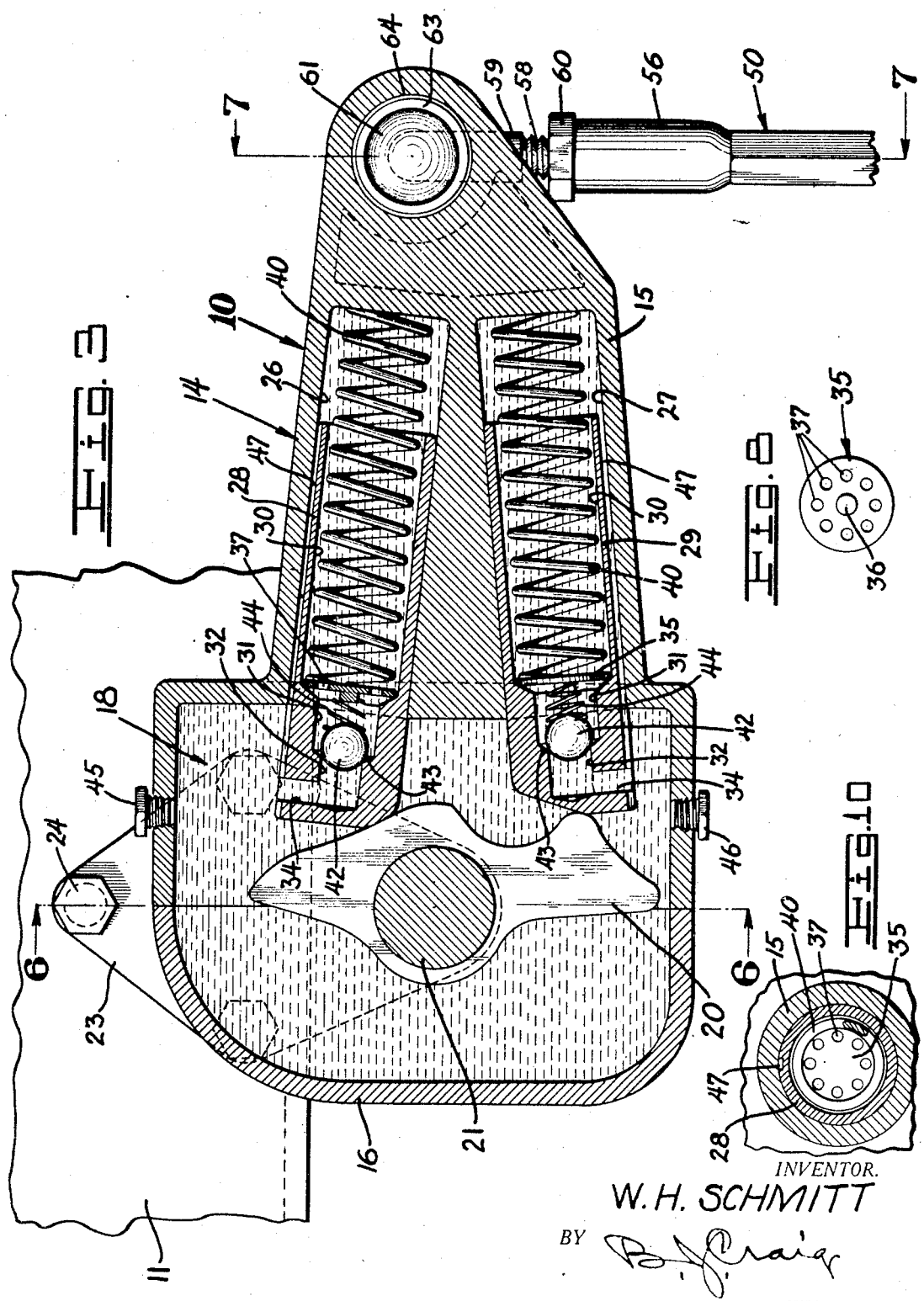
INVENTOR.
W. H. SCHMITT
BY
ATTORNEY.

Nov. 3, 1931.   W. H. SCHMITT   1,829,946
HYDRAULIC SHOCK ABSORBER
Filed June 11, 1928   4 Sheets-Sheet 3
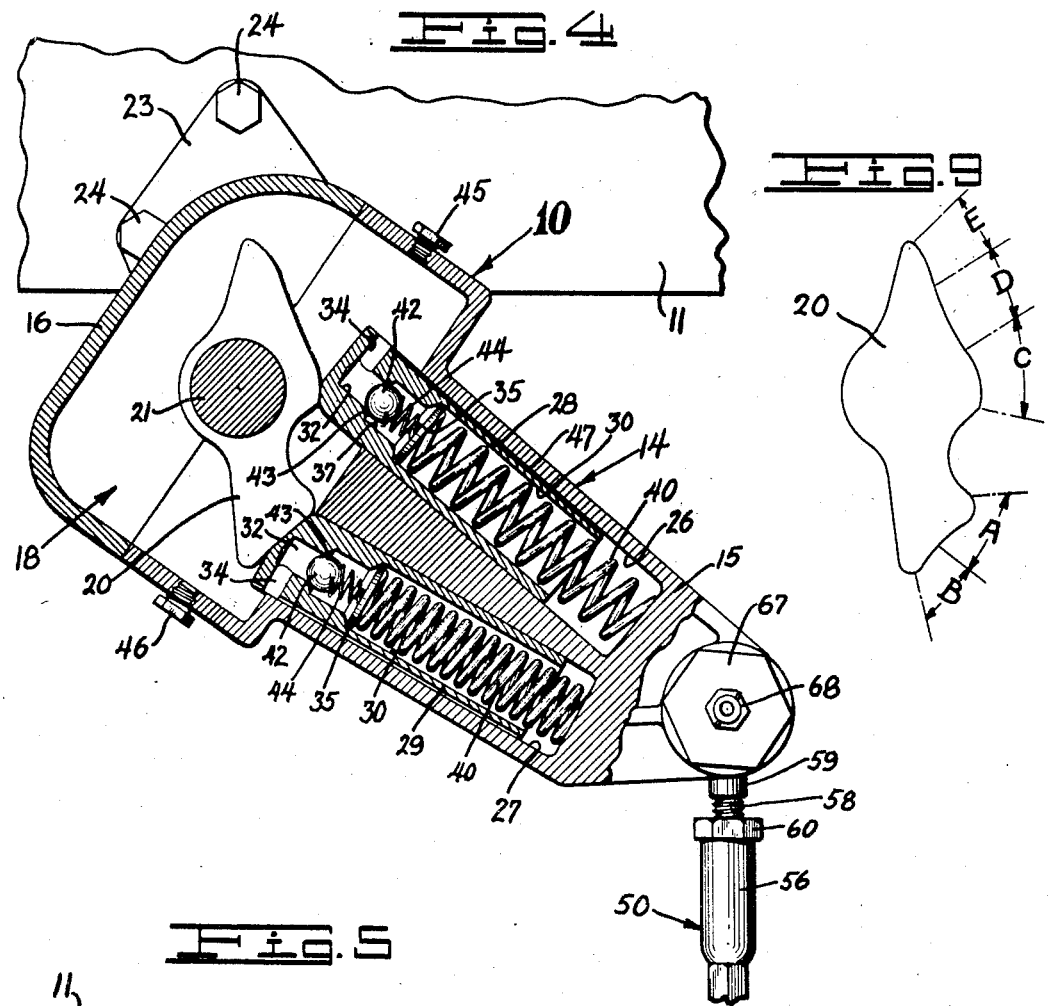
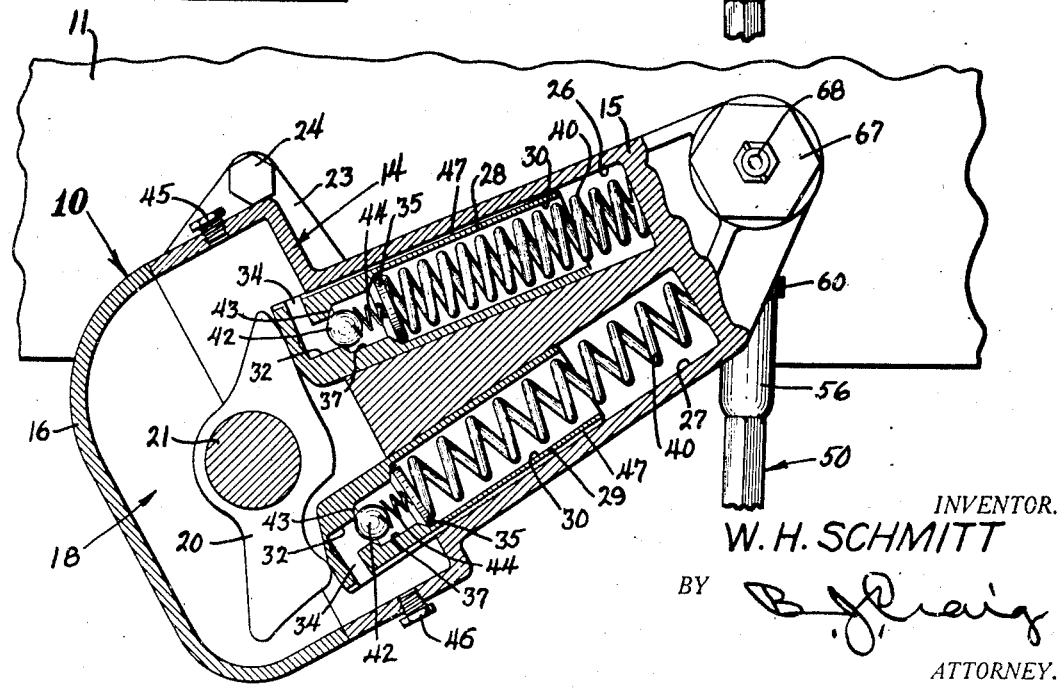
INVENTOR.
W. H. SCHMITT
BY
ATTORNEY.

Nov. 3, 1931.  W. H. SCHMITT  1,829,946
HYDRAULIC SHOCK ABSORBER
Filed June 11, 1928    4 Sheets-Sheet 4
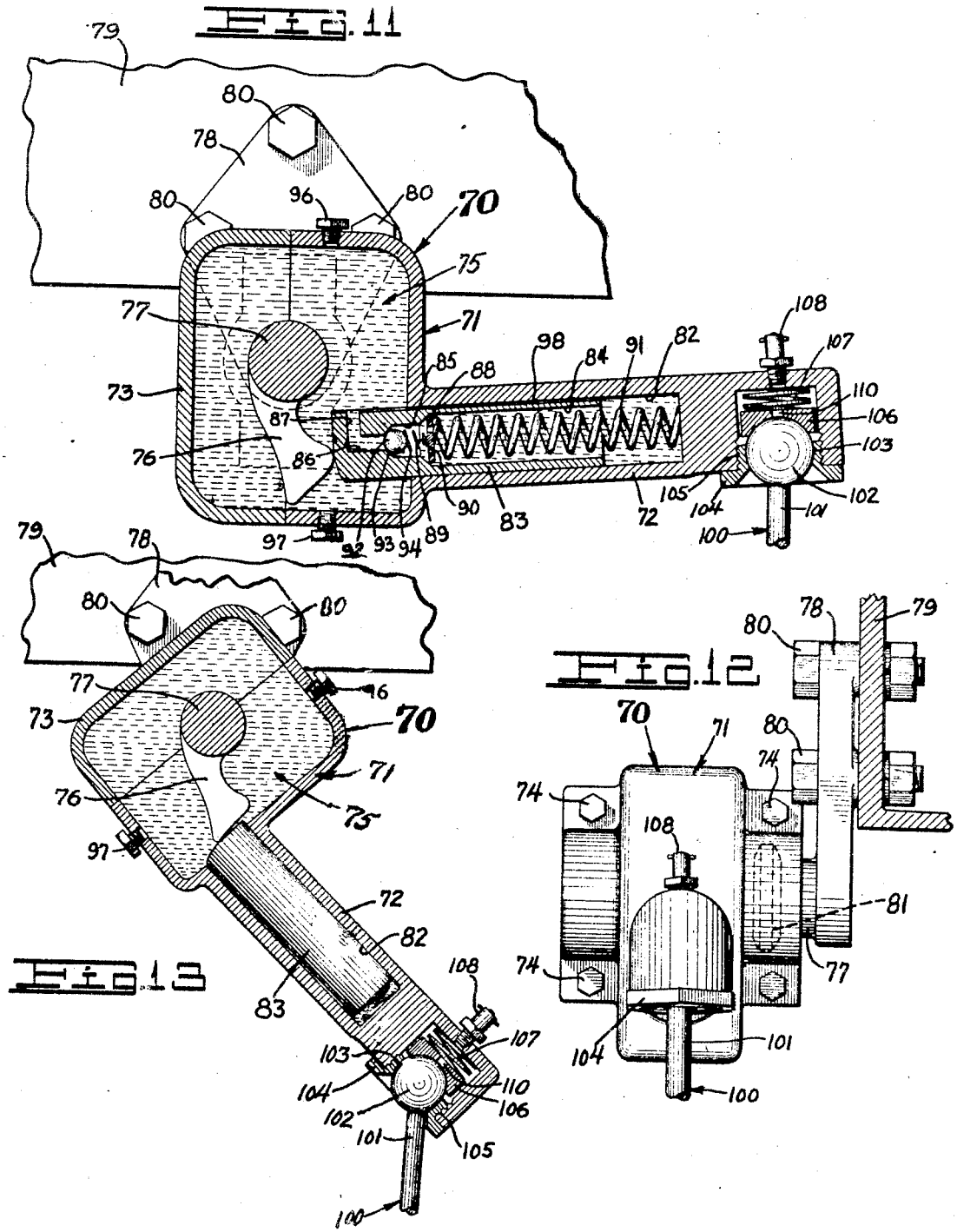
INVENTOR.
W. H. SCHMITT
BY
ATTORNEY.

Patented Nov. 3, 1931

1,829,946

UNITED STATES PATENT OFFICE

WILLIAM H. SCHMITT, OF LONG BEACH, CALIFORNIA, ASSIGNOR TO ROBERT V. FUNK, OF LONG BEACH, CALIFORNIA

HYDRAULIC SHOCK ABSORBER

Application filed June 11, 1928. Serial No. 284,331.

This invention relates to improvements in vehicle spring controlling devices.

The general object of this invention is to provide an improved spring control device which will not cause a jerking action when used and which will allow the springs to take a slight normal movement before the device actuates to control the action.

Another object of the invention is to provide a hydraulic spring control device which is made without adjustable valves.

A further object of the invention is to provide a novel means for connecting a spring control device and a vehicle.

My invention aims among other things to provide a novel hydraulic shock absorber wherein both the up and down stroke of the spring is controlled whereas heretofore other devices have merely controlled the rebound action.

In comparing the action of my shock absorber with hydraulic and friction snubbers with which I am familiar, the most outstanding feature is that my device controls the spring in proportion to the speed of the rebound while the old devices have the same tension regardless of speed, and in cases where the action is very severe, they lose a part of their tension due to the velocity of the fluid in the hydraulic type or the speed of the stroke in the friction type.

My shock absorber works in complete harmony with the spring action, being more severe on extreme action and less severe where the action is not so pronounced. The cam operation is such that it eliminates hard riding when the rebound action takes place. For example, take a car body weighing 2000 lbs., and assume that each spring is carrying an equal load and compressed to a tension of 500 lbs. If one wheel passes over a hole or hollow in the road, the body has a tendency to carry its same position for an instant, but the weight of the wheel and the tension of the spring forces the wheel to the bottom of the hole with terrific force. The shock absorbed being connected between the body and axle will have a tendency to give the car a severe downward jerk, and the former type of shock absorbers which are set at high tension will send a blow through the body of the car. Unlike this action my shock absorber provides a mild tension and entirely eliminates this blow.

The device is so constructed that when a vehicle equipped with it passes over an obstruction or anything to compress the springs, the shock absorber begins action immediately and snubs the body back to normal position, the speed of the stroke always governing the resistance and in case the rebound is so severe as to cause the body to go above normal position my device snubs the action with a tension equivalent to the speed of the action. If the action is violent my device goes into an extreme tension and checks the speed very rapidly.

Other objects and advantages of this invention will be apparent from the following description taken in connection with the accompanying drawings wherein:

Fig. 1 is an end view of my improved hydraulic control device showing it secured to the chassis frame and connected to the front axle of a vehicle.

Fig. 2 is a section taken on line 2—2 of Fig. 1, showing a side elevation of the device.

Fig. 3 is an enlarged section taken on line 3—3 of Fig. 1, showing the device in a neutral position.

Fig. 4 is a view similar to Fig. 3 on a reduced scale showing the device in a downstroke position.

Fig. 5 is a view similar to Fig. 4 showing the device in an upstroke position.

Fig. 6 is a reduced section taken on line 6—6 of Fig. 3.

Fig. 7 is a reduced section taken on line 7—7 of Fig. 3.

Fig. 8 is a detailed elevation of one of the plunger disks.

Fig. 9 is a diagrammatic view of the cam showing the relative working surfaces.

Fig. 10 is a cross section of one of the pistons and fragment of the housing.

Fig. 11 is a longitudinal section through a modified form of vehicle spring control device.

Fig. 12 is an end view of the device shown in Fig. 11, and

Fig. 13 is a view similar to Fig. 11 on a reduced scale showing the device in a down stroke position.

Referring to the drawings by reference characters I have indicated my improved hydraulic spring control device generally at 10 and shown it as rigidly attached to a side channel 11 of a vehicle chassis and flexibly connected to the front axle 12 of the vehicle.

The device 10 as shown comprises a housing indicated generally at 14 which includes a body portion 15 and a cap 16, which when operatively secured together by bolts 17 or other suitable securing means forms a chamber 18 in which a cam 20 is positioned.

The cap 20 is mounted on a shaft 21 which is positioned in suitable bearings in the body 15 and the cap 16 and is supported by a bracket 23 which is adapted to be rigidly secured to the channel 11 by bolts 24 or other suitable securing means.

In the portion of the body 15 and the cap 16 where the shaft extends therethrough, suitable packing means is provided in the body and the cap as indicated at 25 in Fig. 6.

In the body 14 bores 26 and 27 are provided, one end of each of which opens into the chamber 18 and the other ends of which are closed and have no communication with each other except through the chamber 18.

In the bores 26 and 27 pistons 28 and 29 are provided. Each of these pistons include a recess 30 communicating with a reduced chamber 31 which communicates with a reduced bore 32 having a transverse aperture 34 extending therefrom through the piston and opening into the chamber 18. A disk 35 is positioned in the recess 30 and is adapted to bear against the tapered shoulder formed at the juncture of the recess 30 and the reduced chamber 31. As shown in Fig. 8 the disk 35 includes a central hub 36 and a plurality of apertures 37.

A coiled spring 40 is positioned in the recesses 30 of the pistons 28 and 29 and one end of each of the springs is adapted to bear against the disk 35 and the opposite ends of the springs are adapted to bear against the closed ends of the bores 26 and 27 to thereby normally urge the pistons into contact with the cam 20.

The entrance to each of the chambers 31 of the pistons is adapted to be closed by ball valves 42 which are adapted to be resiliently urged into contact with seats 43 formed at the juncture of the chambers 31 and the bores 32 by coiled springs 44. One end of the coiled springs 34 engages the hubs 36 on the disks 35 and the opposite ends of the coiled springs engage the balls 42.

The chamber 18 and the bores 26 and 27 are adapted to be filled with oil or other suitable fluid as shown in Fig. 3, for which a filler plug 45 and a draining plug 46 are provided. Each of the pistons is provided with a groove 47 shown as arranged in the outer surface thereof and extending therealong. The grooves 47 may be provided in the faces of the bores 28 and 29 if desired.

When one piston moves into the chamber 18 the valve ball 42 in that piston moves out of engagement with the seat 43 and the oil enters through the aperture 34, bore 32, chamber 31 and thence through the apertures 37 in the disk 35 into the piston recess 30. While one piston moves into the chamber 18 the other moves out of the chamber. When a piston moves out of the chamber the oil is forced out from the bores 26 or 27 through the grooves 47.

The housing 14 is adapted to be connected to the vehicle axle 12 and move about the cam 20. For connecting the housing to the axle I have provided a connecting link indicated generally at 50.

As shown in Figs. 1 and 2 the lower end of the link 50 is provided with a swivel connection indicated at 51 which is adapted to be secured to a bracket 52 secured to the front axle 12 of the vehicle by clamping it against the axle with the nuts 53 of one of the U-bolts 54 which secure the vehicle leaf spring 55 to the axle 12. As shown in Fig. 7 the upper end of the link 50 is provided with an enlarged portion 56 having a screw threaded aperture 57 therein in which a screw threaded portion 58 of a curved shank 59 is adapted to be positioned and locked against accidental movement by a lock nut 60.

A ball 61 is provided on the shank 59 which is adapted to be positioned in a seat 62 of a nut 63 which is positioned in a screw threaded recess 64 adjacent the end of the housing 14. The ball 61 is adapted to be retained against the seat 62 by a member 65 which is resiliently retained against the ball by a coiled spring 66 which bears against a nut 67 positioned in the screw threaded recess 64 of the housing.

For lubricating the ball and socket mechanism a fitting 68 is preferably positioned in the nut 67 and an aperture 69 is provided in the member 65.

The piston 29 is adapted to function on the downward movement of the device and the piston 28 is adapted to function on the upstroke of the device. On a downstroke of the device as shown in Fig. 4, as the piston 29 travels over the surface of the cam indicated at A in Fig. 9, the inward movement of the piston is comparatively slow. When the piston travels over the surface of the cam indicated at B in Fig. 9, the inward movement of the piston is quick.

On an upstroke of the device as shown in Fig. 5, as the piston 28 travels over the surface of the cam indicated at C, no movement of the piston occurs but when the piston travels over the surface indicated at D, the piston moves inwardly comparatively slow. When, however, the piston travels over the surface of the cam indicated at E, the piston is moved inwardly very rapidly. The inactive portion of the cam indicated at C allows the vehicle spring to flex naturally before the spring control device begins to actuate.

In Figs. 11, 12 and 13 I have indicated generally at 70 a modification of my spring control device which is adapted to act only as a snubber. The device 70 as shown comprises a housing indicated generally at 71, which includes a body portion 72 and a cap 73 which when operatively secured together by bolts 74 or other suitable securing means, forms a chamber 75 in which a cam 76 is positioned. The cam 76 is mounted on a shaft 77 which is positioned in suitable bearings in the body 72 and the cap 73 and is supported by a bracket 78 which is adapted to be rigidly secured to a vehicle side channel 79 by bolts 80 or other suitable securing means. In the portion of the body 72 and the cap 73 where the shaft 77 extends therethrough, suitable packing means is provided in the body and the cap as indicated at 81 in Fig. 12.

In the body 72 a bore 82 is provided, one end of which opens into the chamber 75 and the other end of which is formed closed and a piston 83 is positioned in the bore. The portion 83 is similar to the pistons shown in connection with the device 10 and includes a recess 84 communicating with a reduced chamber 85 which communicates with a reduced bore 86 having a transverse aperture 87 extending therefrom through the piston and opening into the chamber 75. A disk 88 similar to the disk 35 in Fig. 8 is positioned in the recess 84 and is adapted to bear against the tapered shoulder formed at the juncture of the recess 84 and the reduced chamber 85 and includes a central hub 89 and a plurality of apertures 90.

A coiled spring 91 is positioned in the recess 84 of the piston 83 and one end of the spring is adapted to bear against the disk 88 and the opposite end is adapted to bear against the closed end of the bore 82 to thereby normally urge the piston into contact with the cam 72.

The entrance to the chamber 85 of the piston is shown as closed by a ball valve 92 which is resiliently urged into contact with a valve seat 93 formed at the juncture of the chamber 85 and the bore 86 by a coiled spring 94. One end of the coiled spring 94 engages the hub 89 on the disk 88 and the opposite end of the coiled spring engages the ball 92.

The chamber 75 and the bore 82 are adapted to be filled with oil or other suitable fluid as shown in Fig. 11, for which a filler plug 96 and a draining plug 97 are provided. The piston 83 is provided with a groove 98 shown as arranged in the outer surface thereof and extending therealong.

When the piston moves into the chamber 75 the valve ball 92 moves out of engagement with the seat 93 and the oil enters through the aperture 87, bore 86, chamber 85 and thence through the aperture 90 in the disk 88 into the piston recess 84. When the piston moves out of the chamber 75 oil is forced out through the groove 98 into the chamber 75.

The housing 71 is adapted to be connected to the vehicle axle 99 and move about the cam 76. For connecting the housing to the axle I provide a connecting link which I have indicated at 100. The lower end of the link may be pivotally connected to the vehicle axle similar to the connecting link 50 of the device 10, or in any other suitable manner.

As shown the upper end of the link 100 includes a shank 101 having a ball 102 thereon which is adapted to be positioned in a seat 103 of a nut 104 positioned in a screw threaded recess 105 adjacent the end of the housing 71. The ball 102 is adapted to be retained against the seat 103 by a member 106 which is resiliently retained against the ball by a coiled spring 107 which bears against the end of the recess 105. For lubricating the ball and socket mechanism a fitting 108 is preferably positioned adjacent the end of the housing and enters the recess 105, and an aperture 109 is provided in the member 110.

The device 70 is adapted to retard the movement of the axle away from the channel 11 only and when the device is in a normal position as shown in Fig. 11, the shape of the cam allows the device to move downward slightly without causing any movement of the piston, thereby not applying any retarding action during a slight natural flex of the vehicle springs, but should the device continue to move downward towards the position shown in Fig. 13 the cam forces the piston out of the chamber 75 slowly at first and then more rapidly as it nears the position shown in Fig. 13.

From the foregoing description it will be apparent that I have provided a novel hydraulic spring control device which is positive in operation, simple in construction, readily installed and can be economically manufactured.

Having thus described my invention, I claim:

1. In combination with a vehicle, a housing including a chamber, a shaft fixed relative to said vehicle, a cam on said shaft in said housing, said cam being fixed rigid relative to said vehicle, a plurality of pistons in said housing adapted to engage said cam, said housing being connected to an axle of said vehicle, said housing being adapted to move about said cam.

2. In a shock absorber including a casing, a piston movable into the casing to control downward movement, a second piston movable into the casing to control upward movement and a single immovable cam member in the casing, coating with both pistons to control the operating force, said casing being mounted for movement about said cam.

3. In a shock absorber a casing having a pair of pistons movable therein, a cam in said casing, means on said cam for rigidly securing it to a vehicle body, means to swing said casing about said cam, means to hold said pistons against said cam, said cam including a portion to first cause no movement of the piston when the casing is turned about the cam, another portion to cause a slow movement of the piston and yet another portion to cause a quick movement of the piston when the casing is turned about the cam.

4. In a device of the class described, a housing adapted to be fixed to a vehicle and including a chamber, a shaft in said housing and about which said housing rotates, cam means fixed on said shaft, a plurality of pistons movable in said housing adapted to engage said cam means, said housing being swivelled on said axle and adapted to move about said cam.

5. In combination with a vehicle, a shaft secured to said vehicle, a housing including a chamber, said housing being mounted to swing on said shaft, a piston in said housing, a cam mounted on said shaft and fixed relative to said vehicle, said cam engaging said piston, said housing being connected to an axle of said vehicle and being adapted to move about said cam.

6. In a device of the class described, a vehicle, a housing including a chamber, a cam means fixed relative to said vehicle, a plurality of pistons in said housing adapted to engage said cam means, said cam means being mounted on a shaft, said shaft extending out of said chamber and being adapted to be rigidly connected to a vehicle frame, and means on said housing adapted to be connected to the vehicle.

7. In a device of the class described, a housing including a body portion and a cap, a chamber formed by a portion of said body and said cap, cam means positioned in said chamber, means to rigidly secure said cam means to the frame of a vehicle the parts forming said chamber being movable about the cam, bores in said body extending from one side of said chamber, a piston in each of said bores, each of said pistons being adapted to engage said cam means, each of said pistons having a recess, a valve chamber communicating with said recess and having a passageway opening into said first chamber, a valve seat in said valve chamber, a valve adapted to engage said seat, and means to urge said pistons into contact with said cam means.

8. In a device of the class described, a housing including a hollow body portion forming a chamber, a cam positioned in said chamber, means to rigidly secure said cam to the frame of a vehicle said housing being rotatable about said cam, a bore in said body extending from one side of said chamber, a piston in said bore, said piston being adapted to engage said cam, said piston having a recess, a valve chamber communicating with said recess and a passageway opening into said first chamber, a valve seat in said valve chamber, a valve ball adapted to engage said seat, means to urge said ball against said seat and means to urge said piston into contact with said cam.

9. In a device of the class described, a housing including a chamber, a cam adapted to be positioned in said chamber, a shaft extending into said housing, said cam being mounted on said shaft, a bracket, said shaft being rigidly supported by said bracket, said bracket being adapted to be rigidly secured to the frame of a vehicle said housing being swivelled about said shaft, a pair of superimposed bores in said body extending from one side of said chamber, a piston in each of said bores, each of said pistons being adapted to engage said cam, each of said pistons including a recess, a valve chamber communicating with said recess and a passageway opening into said first chamber, a valve seat in said valve chamber, a valve ball adapted to engage said seat, means to resiliently urge said ball against said seat and a spring in each of said piston recesses to resiliently urge said pistons into contact with said cam.

10. In a device of the class described, a housing including a chamber, a cam positioned in said chamber, said cam being mounted on said shaft, said shaft being positioned in bearings in said body and said cap, packing means surrounding said shaft, a bracket, said shaft being rigidly supported by said bracket, said bracket being adapted to be rigidly secured to the frame of a vehicle said housing being swivelled about said shaft, a pair of superimposed bores in said body extending from one side of said chamber, a piston in each of said bores, each of said pistons being adapted to engage said cam, each of said pistons including a recess, a valve chamber communicating with said recess and a passageway opening into said first chamber, a disk in said recess, said disk adapted to engage a shoulder formed at the juncture of said recess and said chamber, said disk having a plurality of apertures therethrough, a valve seat in said valve chamber, a valve adapted to engage said seat, a spring adapted to engage said disk and said valve to resiliently urge said valve to its seat, and a spring in each of said piston recesses adapted to resiliently urge said pistons into contact with said cam.

11. A shock absorber including a casing, a cam member in said casing, a shaft on which said cam is rigidly mounted, said shaft being rigidly mounted on a vehicle frame and said casing being rotatably mounted on said shaft, a piston movable in said casing, said piston engaging the operating face of the cam and means to conduct fluid from said casing to the end of said piston which is remote from said cam.

12. In combination with a vehicle, a support secured to said vehicle, a housing including a chamber, said housing being mounted to swing on said support, a piston in said housing, a cam mounted on said support and fixed relative to said vehicle, said cam engaging said piston, said housing being connected to an axle of said vehicle and being adapted to move about said cam.

13. A shock absorber including a casing, a cam member in said casing, a support on which said cam is rigidly mounted, said support being rigidly mounted on a vehicle frame and said casing being rotatably mounted on said support, a piston movable in said casing, said piston engaging the operating face of the cam and means to conduct fluid from said casing to the end of said piston which is remote from said cam.

In testimony whereof, I hereunto affix my signature.

WM. H. SCHMITT.